(12) United States Patent
Luwang et al.

(10) Patent No.: US 9,792,091 B2
(45) Date of Patent: Oct. 17, 2017

(54) QUANTITATIVE EVALUATION AND OPTIMIZATION OF USER INTERFACE SOFTWARE DESIGN

(71) Applicant: SAP SE, Walldorf (DE)

(72) Inventors: Tianyu Luwang, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 125 days.

(21) Appl. No.: 14/568,135

(22) Filed: Dec. 12, 2014

(65) Prior Publication Data

US 2016/0170713 A1 Jun. 16, 2016

(51) Int. Cl.
*G06F 9/44* (2006.01)
*G06Q 10/06* (2012.01)

(52) U.S. Cl.
CPC .............. *G06F 8/20* (2013.01); *G06Q 10/06* (2013.01); *G06F 8/38* (2013.01)

(58) Field of Classification Search
USPC ........................................................ 717/105
See application file for complete search history.

(56) References Cited

U.S. PATENT DOCUMENTS

| 7,350,190 | B2* | 3/2008 | Torres | G06F 9/4443 706/11 |
| 7,509,629 | B2* | 3/2009 | Sakamoto | G06F 17/5022 703/22 |
| 7,673,287 | B2* | 3/2010 | Mayer-Ullmann | G06F 8/73 703/22 |
| 8,621,420 | B2* | 12/2013 | Brown | G06F 8/10 717/104 |
| 8,631,338 | B2* | 1/2014 | Sen | G06F 3/0481 715/762 |
| 9,110,969 | B2* | 8/2015 | Li | G06F 17/30595 |
| 2002/0188717 | A1* | 12/2002 | Mushlin | G06F 11/3447 709/224 |
| 2005/0289561 | A1* | 12/2005 | Torres | G06F 9/4443 719/328 |
| 2006/0235690 | A1* | 10/2006 | Tomasic | G06F 3/0481 704/257 |
| 2006/0235691 | A1* | 10/2006 | Tomasic | G06F 3/0481 704/257 |
| 2009/0112621 | A1* | 4/2009 | Jung | G06F 19/328 705/2 |
| 2010/0050152 | A1* | 2/2010 | Gilboa | G06F 8/38 717/106 |
| 2010/0131916 | A1* | 5/2010 | Prigge | G06F 8/10 717/104 |
| 2011/0041117 | A1* | 2/2011 | Grechanlk | G06F 8/34 717/104 |
| 2012/0260230 | A1* | 10/2012 | Choudhary | G06F 11/3616 717/105 |
| 2012/0324359 | A1* | 12/2012 | Lee | G06F 11/3438 715/733 |

(Continued)

*Primary Examiner* — Marina Lee

(57) ABSTRACT

Disclosed herein are technologies for quantitative evaluation and optimization of user interface and software design. In one implementation, a design step in a software process is chosen. The software process may be evaluated with different design elements, and time penalties for the different design elements may be determined during the evaluation. A design element of the design step may then be changed to one of the different design elements with the lowest time penalty.

20 Claims, 7 Drawing Sheets

(56) References Cited

U.S. PATENT DOCUMENTS

| | | | |
|---|---|---|---|
| 2014/0032514 A1* | 1/2014 | Li | G06F 17/30536 |
| | | | 707/703 |
| 2014/0101024 A1* | 4/2014 | Li | G06Q 40/025 |
| | | | 705/38 |
| 2015/0120600 A1* | 4/2015 | Luwang | G06Q 10/08355 |
| | | | 705/338 |
| 2016/0170713 A1* | 6/2016 | Luwang | G06F 8/20 |
| | | | 717/105 |

* cited by examiner

QUANTITATIVE EVALUATION AND OPTIMIZATION OF USER INTERFACE SOFTWARE DESIGN

TECHNICAL FIELD

The present disclosure relates generally to software design, and specifically to quantitative evaluation and optimization of user interface and design processes.

BACKGROUND

The software development cycle may include the following stages: define, design, develop, and deliver. In the define stage, tasks, roles and related dependencies of the execution process are modelled. The design stage is an abstraction of user and/or system activities of the process. In the design stage, the specification of software realization of the process is created. The design stage may include architectures, algorithms, and user interfaces. The design stage allows users to carry out the defined process over information technology or IT infrastructures. The define stage and the design stage may have some overlap, which means the define stage may take certain IT factors into account and the design stage can help refine the software process.

There are various possible options for process definition and software design. Tasks may be divided into smaller sub-tasks or sub-processes. Different algorithms may be used, as well as different data structures. Different user interface or UI elements may be used for the same task or sub-task (e.g., checkbox vs. radio box). A complete software design specification may be based on the choices of these options. These choices may have great impact on the general performance of the software, which includes usability, utility, and total time that users need to spend on the software to finish the process, etc.

In typical software design practices, choices as to design elements may be made by different users, based on their experience and qualitative criteria. Problems may occur when the design elements made by different users are put together. Some of these problems may not be detected until later stages. For example, the integration of tasks may create a prolonged process in which users need to be involved in a number of interactions with the software system. For example, users may get lost or make mistakes after too many pop-up windows and button clicks. Even if a user is able to finish the total process, the time may be too long and costly, drastically reducing the efficiency of the user. If these problems are found during the develop stage or after the software is delivered to customers, the cost of fixing the problems may be great. Great effort and cost may be needed to change the existing design and implementation. Sometimes systematic fixes are not possible and only workarounds may be applied. This may alleviate the problems to limited degrees; however, may make the system unnecessarily complicated. This may also lead to problems in future iterations of the software. Even if problems from poor choices of design elements are addressed at a relatively earlier stage, there may be difficulty in finding a direction to improve current software design, since these problems are usually results of multiple factors (e.g., a combination of several design elements). In other words, adjusting only one factor may not necessarily solve the problem.

SUMMARY

Disclosed herein are technologies for quantitative evaluation and optimization of user interface and software design. In one implementation, a design step in a software process is chosen. The software process may be evaluated with different design elements, and time penalties for the different design elements may be determined during the evaluation. A design element of the design step may then be changed to one of the different design elements with the lowest time penalty.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein are a system and method to provide quantitative measure of efficiency of user interface or software design process, optimization of user interface or software design process, adaptive design optimization for different devices; and integration with user feedback and reflection of user behavior. The term user may refer to a developer, customer, or agent.

Figure 1:
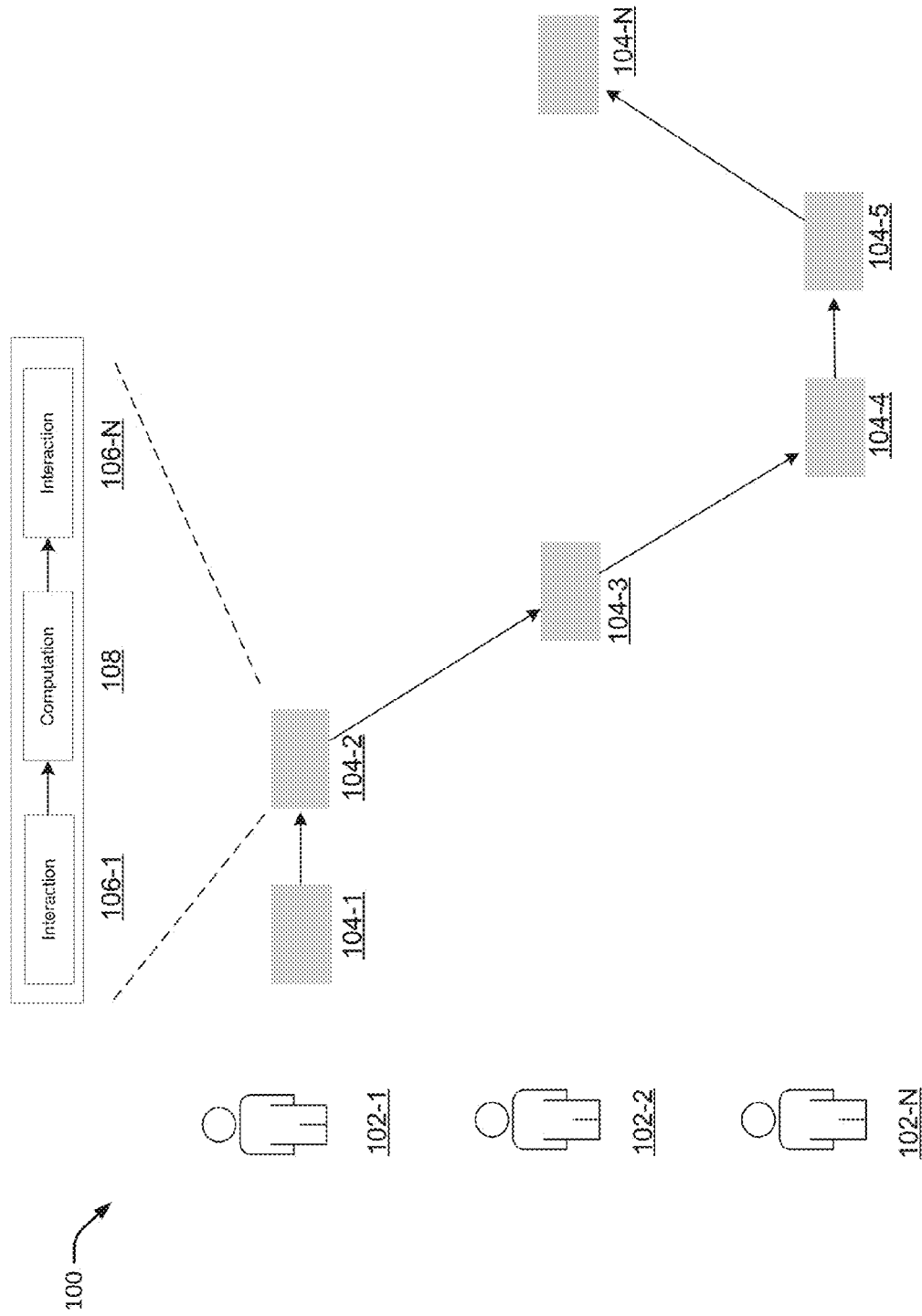
FIG. 1 illustrates an exemplary process diagram.

FIG. 1 shows an example process diagram 100. In particular, a process is a collection of structured activities or tasks that produce a specific result (e.g., service and product). The process may be carried out by multiple persons or users 102. The structure of a process is usually defined at the define stage of software development and represents a basic logic of a business process, which is relatively stable.

The process 100 includes sub-processes 104. A sub-process 104 is a series of user actions and related system actions. A sub-process 104 is performed by one person or user 102. User actions are mainly about understanding the user interface or UI, and making proper interactions 106. Interaction elements or interactions 106 that are chosen at design stage have great impact on user 102 actions. System actions are related to computation of processors and data transfer. Performance of system actions are decided by computation elements chosen at the design stage. After the user 102 finishes a full interaction 106 step, a computation 108 step may be triggered by the interactions 106, and the user 102 may need to wait for the system to finish the computation 108 in order to carry out the next round of interactions 106.

Process 100 may be considered as having a three layer structure. Process 100 may be considered as a first layer. Process 100 is made of a second layer of sub-processes 104. Sub-processes 104 are made up of a third layer of interaction 106 steps and computation 108 steps.

Process 100 may be defined as having a basic structure of a business process and is relatively stable (not readily changed). The process 100 may be carried out by multiple users 102. In this description, the set of process 100 is referred to as P, and indexed by p.

Sub-process 104 has a sequential structure and may be carried by one person or user 102. A sub-process 104 may be part of a different process (other than process 100). The sub-process 104 may be achieved through different designs. In this description, the set of sub-processes 104 is referred to as S, indexed by s; the set of sub-processes 104 in process p is $SUB_p$; the penalty function for the finish time of each sub-process s is $PEN_s$.

Interaction 106 step defines a series of user 102 interactions with the system. Interaction 106 may be achieved through different interaction elements (i.e., one interaction element for one interaction step). The set of interaction 106 steps in sub-process s is $ISTP_s$. The set of interaction elements is I, indexed by i. For each interaction 106 step istp∈$ISTP_s$, the set of possible interaction elements is $IO_{istp}$, and the chosen interaction element may be denoted as $i_{istp}$. The time distribution used on interaction element i may be determined by the user 102 role r and experience level l, as denoted by $FI_{irl}$.

Computation 108 step defines a series of system computations and data transfers. Computation 108 step may be achieved through different computation elements (i.e., one computation element for one computation step). The set of computation 108 steps in sub-process s is $CSTP_s$. The set of computation elements is C, indexed by c. For each computation step cstp∈$CSTP_s$, the set of possible computation elements is $CO_{cstp}$ and the chosen computation element may be denoted as $c_{cstp}$. The time used on computation element c may be determined by the size of related data and the configuration of hardware, as denoted by a function $TC_c(SZ_o, CF_o)$.

Efficiencies of processes may be evaluated through the simulations of different organizations' user behaviors and system behaviors. Therefore, the organization may also be defined. An organization includes an IT system and personnel or users of different roles and experience levels.

For an organization, the set of types of organizations is defined as O, and indexed by o. The number of each organization type o may be defined as $N_o$. The number of executions of each process p for each organization type o in a fixed period of time may be defined as $NE_{op}$. For each sub-process s in each organization type o, the percentage of execution for user of each role r and each experience level l is $PER_{osrl}$.

For an information technology or IT system, the size of data in the IT system may be defined as $SZ_o$. Hardware configuration of the IT system may be defined as $CF_o$.

For a user, the set of roles may be defined as R, and indexed as r. The set of experience levels may be defined as L, and indexed by l. The weight for user of each role r and experience level l in each organization o may be defined as $w_{orl}$.

Figure 2:
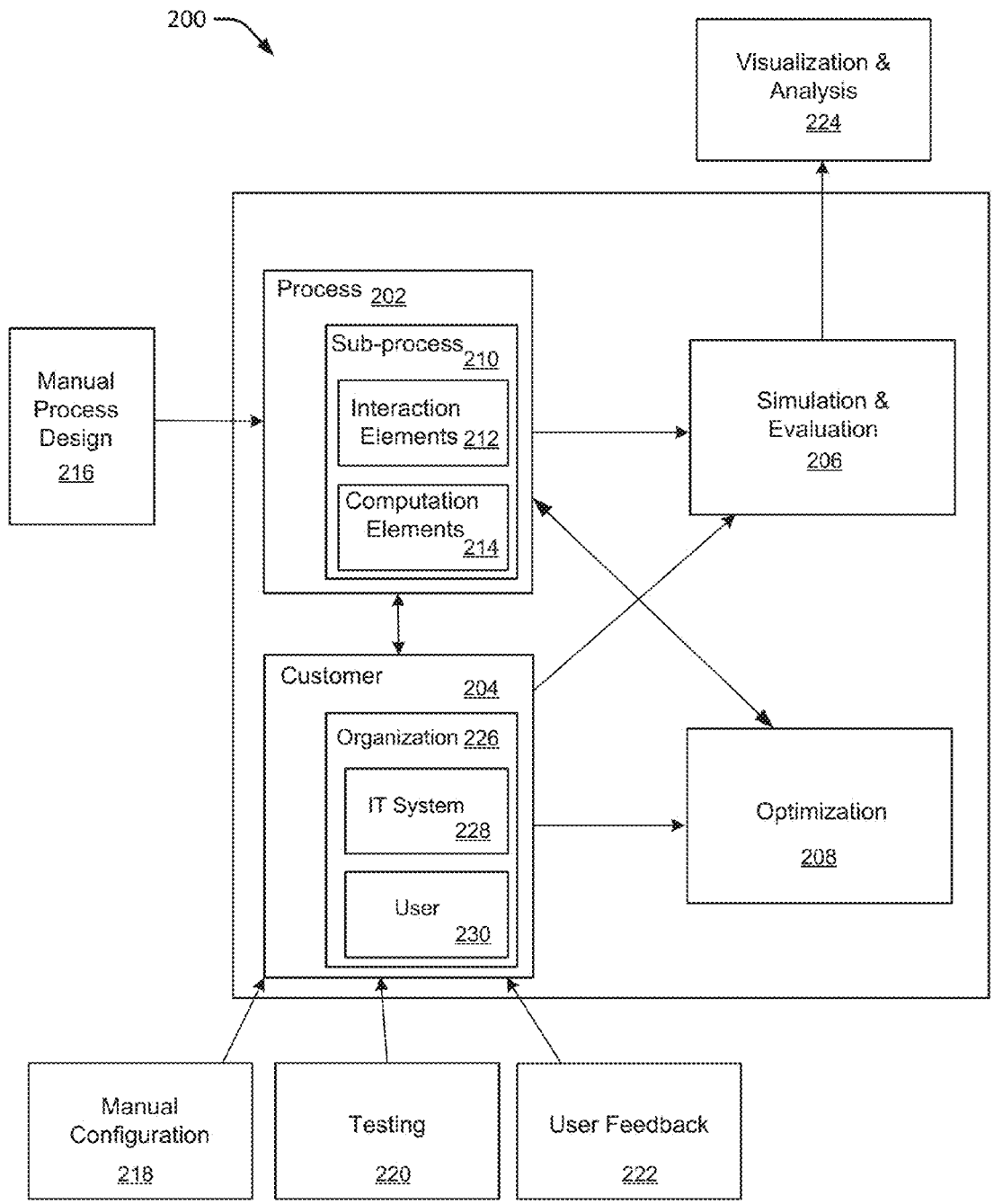
FIG. 2 illustrates an exemplary system.

FIG. 2 shows an example system 200. The system 200 includes a process module 202, a customer module 204, a simulation and evaluation module 206, and an optimization module 208.

The process module 202 models process and sub-process 210, interaction elements 212, and computation elements 214. The process module 202 receives structures of process designs from a manual process design module 216.

The customer module 204 models the behaviors of organizations using the software, including IT system behaviors and user behaviors. The customer module 204 receives input from manual configuration module 218, testing module 220, and user feedback module 222. The input from manual configuration module 218 is an estimation of system behaviors and user behaviors. The input from testing module 220 may include system behaviors and user behaviors collected through the testing stage. The input from user feedback module 222 may include system behaviors and user behaviors collected through the execution of business processes. The customer module 204 sends system related information, including data size and hardware configuration, to the process module 202 to get the time used on computation elements 214. The customer module 204 also sends user related information to the process module 202, such as role and experience level, to get the time used on interaction elements 212.

The simulation and evaluation module 206 receives information from the process module 202 and the customer module 204, and sends the results to a visualization and analysis module 224. The customer module 204 includes organization module 226. The organization module 226 includes IT system 228 and user 230 modules.

The optimization module 208 receives information from the process module 202 and the customer module 204, and computes the optimal choices for interaction elements 212 and computation elements 214, and sends the results back to the process module 202 to optimize sub-processes 210.

The time distribution and time penalty of a user with a role r and experience level l in an organization type o to finish a sub-process s may be denoted as $FS_{orls}$, and determined as follows.

For each interaction step istp∈$ISTP_s$, its chosen interaction element is $i_{istp}$. Sampling once from its time distribution $FI_{(i_{istp})rl}$ gives one instance of interaction time for a user of role r and experience level l to finish the interaction element $i_{istp}$. The sampled time could be denoted as $TI_{istp}$.

For each computation step cstp∈$CSTP_s$, its chosen computation element is $c_{istp}$. For an organization of type o, the time needed to finish computation element $c_{istp}$ is defined as $TC_{c_{istp}}(SZ_O, CF_O)$.

Therefore, for one sampling of the time for a user of role r and experience level l in organization of type o, to finish a sub-process s, is to sum the time used for each interaction element and each computation element as defined by the following Equation 1.

$$TS_{orls} = \Sigma_{istp \in ISTP_s} TI_{istp} + \Sigma_{cstp \in CSTP_s} TC_{c_{istp}}(SZ_O, CF_O) \quad \text{Equation 1}$$

Applying the above steps for a considerable number of times, which may be denoted as NS, and usually larger than 100, the same amount of $TS_{orls}$ may be generated. The distribution is an approximation to the exact distribution. Generally speaking, more sampling times may lead to more accurate approximation. The distribution of $TS_{orls}$ may be used as $FS_{orls}$.

Figure 3:
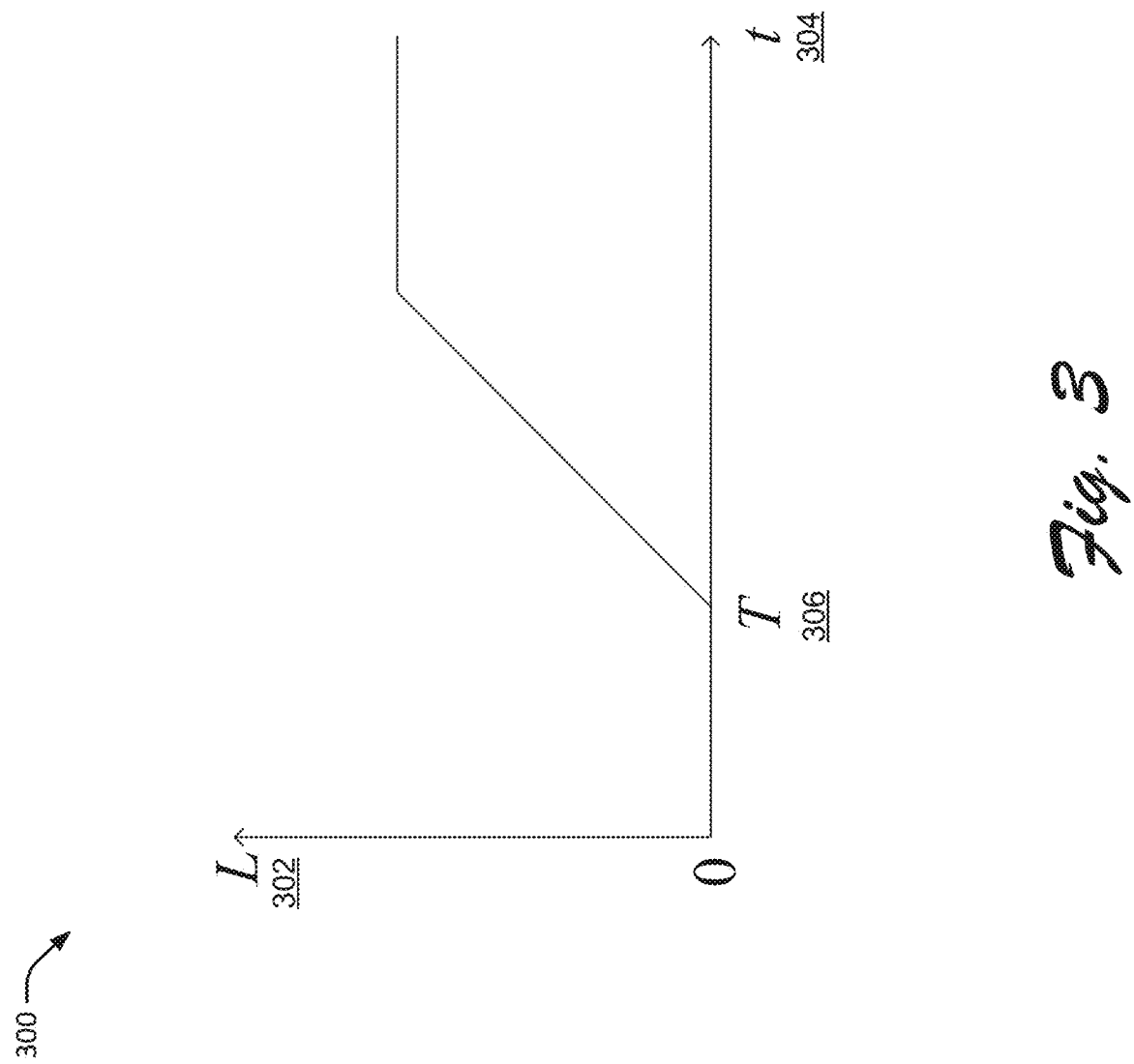
FIG. 3 illustrates an exemplary graph of a penalty function over finish time of a sub-process.

FIG. 3 shows an example graph 300 of a penalty function of experience level L 302 over finish time t 304 of a sub-process. In this example, the penalty is 0 when the finish time is lower than a certain threshold T 306. Graph 300 shows that users can be more focused and assured of efficiency of the whole process, if the sub-process can be finished relatively quickly. The penalty function may also be a linear function. The expected time penalty may be approximated as defined by the following Equation 2.

$$PENOSRL_{orls} = \frac{\Sigma_{NS} PEN_S(TS_{orls})}{NS} \quad \text{Equation 2}$$

Figure 4:
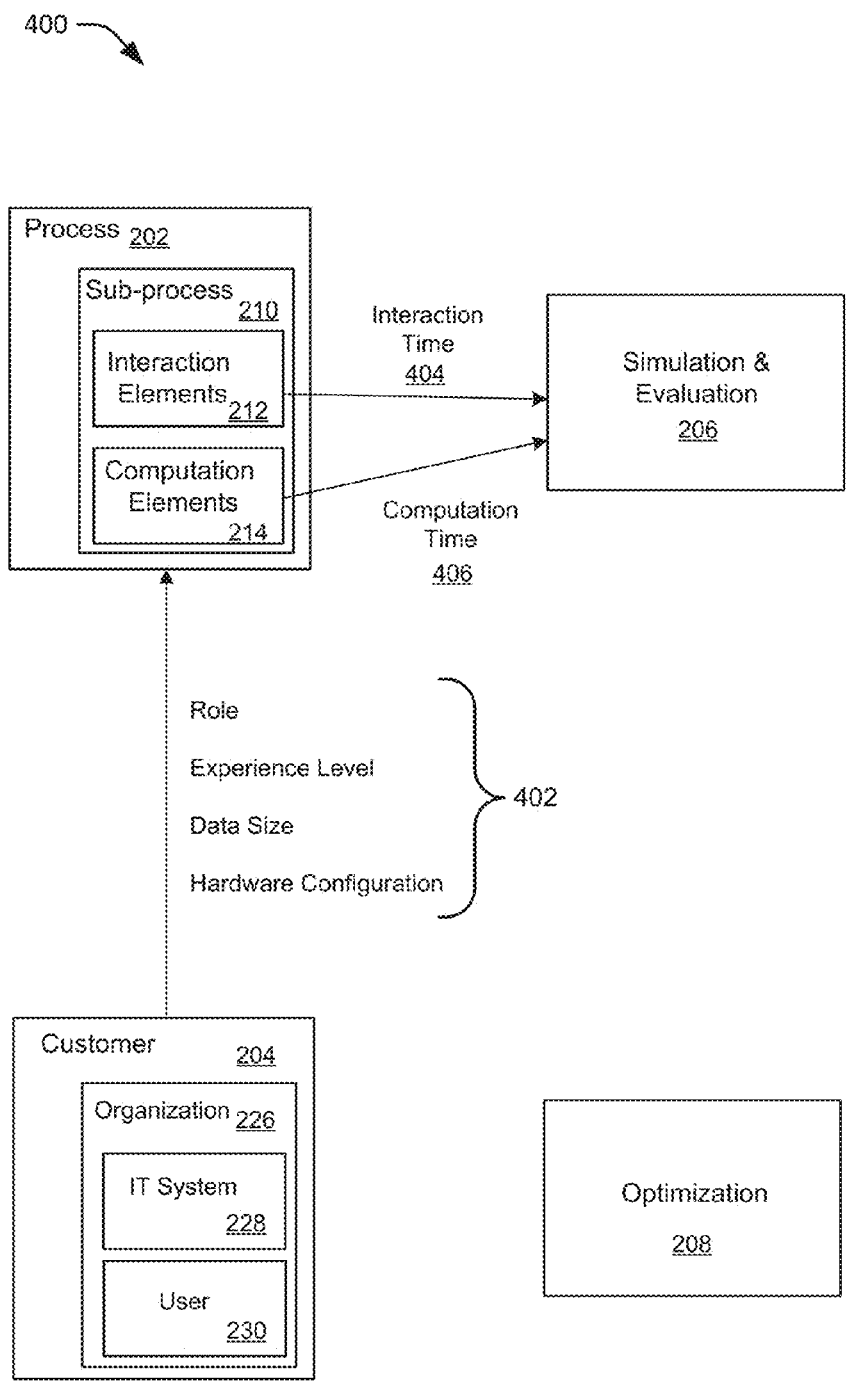
FIG. 4 illustrates an exemplary data flow.

FIG. 4 shows an example related data flow 400 between the modules. The information "Role, Experience Level, Data Size, and Hardware Configuration" 402 is provided by customer module 204 to process module 202. Interaction elements 212 provide "Interaction Time" 404 to simulation and evaluation module 206. Computation elements 214 provide "Computation Time" 406 to simulation and evaluation module 206.

The time distribution of an organization of type o to finish a process may be denoted as $FP_{op}$ and determined as follows.

For each sub-process $s \in SUB_p$, sampling once from the percentage of execution $PER_{osrl}$ for user of each role r and each experience level l on sub-process s and organization type o gives a user of role r and experience level l. Then sampling once from $FS_{orls}$ gives the time for one execution of sub-process s. The time may be denoted as $TS_s$.

A graph may be constructed according to the structure of process p. Each sub-process $s \in SUB_p$ may be treated as a node with execution time $TS_s$. A start node and an end node may be added to the graph. The start node connects to the nodes without inbound arcs and the end node connects to the nodes without outbound arcs. The execution time of both nodes is 0. The following pseudo code listing may define such a function.

```
function EndTime(Node s)
    if Node s is the start node then
        return 0
    else
        for all q in Prerequisite(s) do
            preEndTime[q] ← EndTime(Node s)
        end for
        return TS_s + max(preEndTime[q])
    end if
end function
```

In this sampling instance, the time to finish the process p is given by $TP_{op}$=EndTime(EndNode). By applying the above steps for a considerable number of times, the same amount of $TP_{op}$ may be generated. Its distribution is an approximation to the exact distribution. The distribution of $TP_{op}$ may be used as $FP_{op}$.

The time distribution of an organization of type o to finish a process p shows an aspect of the process' efficiency. Prolonged processes are more vulnerable to disruptions.

Figure 5:
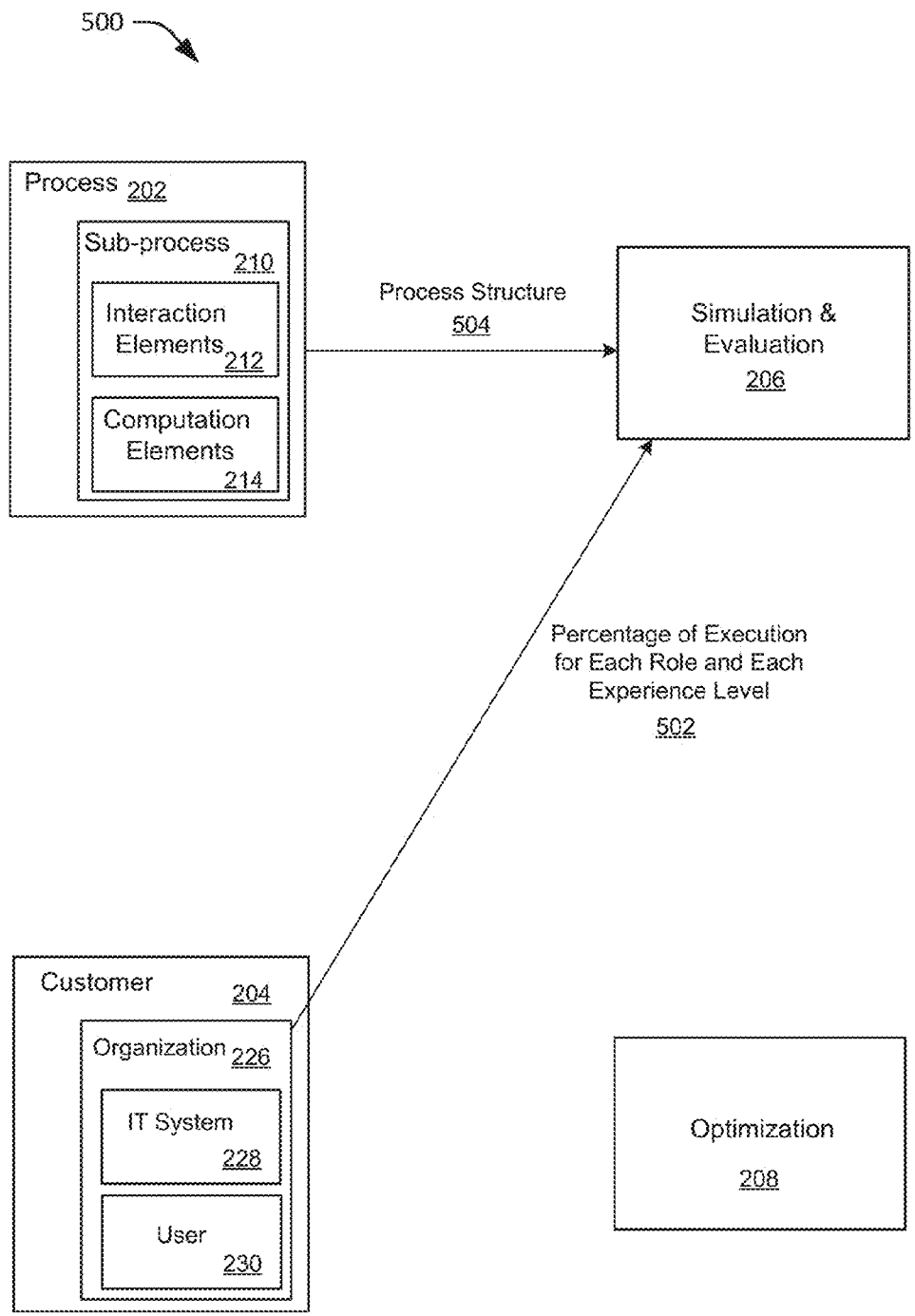
FIG. 5 illustrates another exemplary data flow.

FIG. 5 shows an example related data flow 500 between the modules. The information "Percentage of execution for each role and each experience level" 502 is provided by the organization module 226 of customer module 204 to simulation and evaluation module 206. Process module 202 provides "Process structure" 504 to simulation and evaluation module 206.

The weighted total time to finish a process p for an organization of type o may be defined by the following Equation 3.

$$WTOP_{op} = \Sigma_{rinR} \Sigma_{linL} \Sigma_{s \in SUB_p} \text{mean}(FS_{orls}) w_{orl} PER_{osrl} \quad \text{Equation 3}$$

If $w_{orl}=1$, $WTOP_{op}$ is the total time of all users to finish a process p for an organization of type o. The weighted total time for an organization of type o to finish all type p processes in a certain period of time could be defined by the following Equation 4.

$$WTO_{op} = WTOP_{op} NE_{op} \quad \text{Equation 4}$$

Therefore, if process p is time consuming and is executed frequently in an organization, it is important to improve the efficiency of process p. Improvement may be indicated by $WTO_{op}$.

The weighted total time for all users to finish all type p processes in a certain period of time may be defined by the following Equation 5.

$$WT_p = \Sigma_{oinO} WTO_{op} N_o \quad \text{Equation 5}$$

A high $WT_p$ may indicate a process redesign potential to improve overall user efficiency.

The weighted total time penalty to finish a sub-process s for an organization of type o may be determined as follows. A search is performed for the set of processes, $PS_s$ which contain sub-process s. The total time penalty to finish a sub-process s for an organization of type o may be defined by the following Equation 6:

$$PENOS_{os} = \Sigma_{pinPS_s} \Sigma_{rinR} \Sigma_{linL} NE_{op} PENOSRL_{orls} PER_{osrl} w_{orl} \quad \text{Equation 6}$$

If $w_{orl}=1$, users of different roles and different experience levels are treated equally. The weighted total time penalty to finish a sub-process s for all users may be defined by the following Equation 7.

$$PENS_s = \Sigma_{oinO} PENOS_{os} N_o \quad \text{Equation 7}$$

From Equation 7, a determination may be made as to optimization of a sub-process s for an organization type o or for all users. The objectives are to minimize $PENOS_{os}$ and $PENS_s$ respectively.

The optimization of a sub-process s for an organization of type o and for users, may be realized with the following. Optimization of sub-process s may involve choosing the proper combination of interaction elements and computation elements for each interaction step and each computation step. The optimal combination could be reached through a "greedy" process. For each "greedy" step, an interaction step or a computation step is randomly chosen. Without loss generality and assuming an interaction step is chosen, evaluation is performed as to the weighted total time penalties for designs using different interaction elements for this step while fixing other design elements. The interaction element with the lowest weighted total time penalty is chosen for this interaction step. The "greedy" process may be continued until no further improvement may be found. When optimizing for organization type o, the weighted total time penalty used for optimization is $PENOS_{os}$. When optimizing for all users, the weighted total time penalty used for optimization is $PENS_s$.

Figure 6:
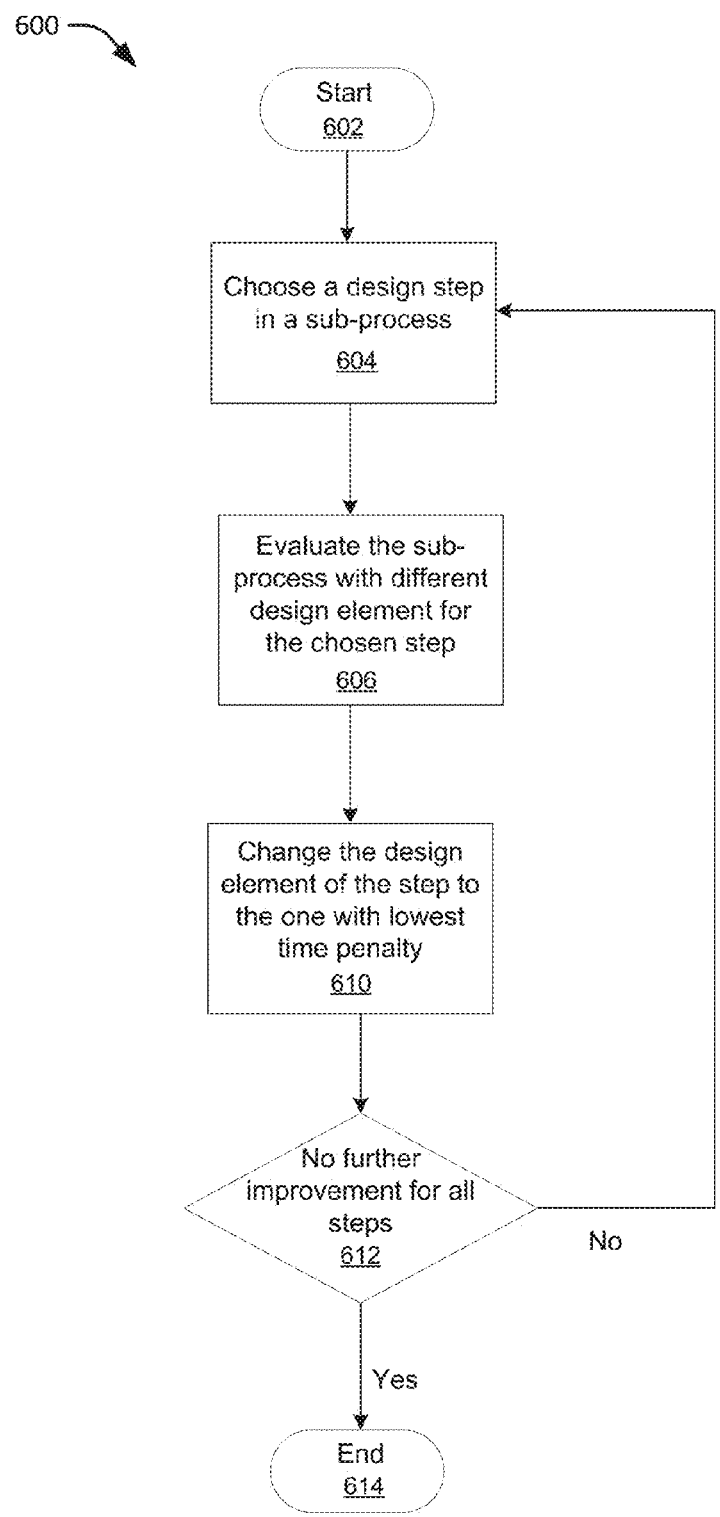
FIG. 6 illustrates an exemplary flow of optimization processes for software development.

FIG. 6 shows an exemplary process 600 for implementing, at least in part, the technology described herein. In particular, process 600 depicts an example flow of optimization processes for software development. The process 600 may be performed by a computing device. An example architecture of such a computer device is described below with reference to FIG. 7.

At 602, process 600 begins.

At 604, choosing a design step in a sub-process is performed.

At 606, evaluating the sub-process with different design elements for the chosen design step is performed.

At 610, changing the design element of the step to the one with the lowest time penalty is performed.

At 612, determining whether any further improvement is required for all the steps is performed.

If no further improvement is needed, following the Yes branch of 612, at 614, the process 600 ends. If further improvement is needed, following the No branch of 612, the process goes back to 604.

The following benefits therefore may be realized. Implementing the described technologies may provide a quantitative measure of efficiency of UI/software design process.

Business processes include a sequence of tasks, which are carried out by users of different roles and experiences. The efficiency of software design is assessed through massive simulations of user behaviors under various business scenarios. To simulate the overall user efficiency of an organization, a certain amount of artificial agents are generated to simulate the general behaviors of employees or users of the organization. Each agent or user may have several properties, including role and experience level.

Implementing the described technologies may provide optimization of UI/software design process. There may be many design options at different aspects of a software system. It may be difficult to strike a balance among conflicting design targets (e.g., usability versus utility). Different design targets may lead to varying efficiencies for different roles. For example, concise UI may improve the efficiency of inexperienced users, but may decrease the efficiency of experienced users. The overall efficiency may be improved through choosing the optimized design elements.

Implementing the described technologies may further provide adaptive design optimization for different devices. For example, more and more mobile devices have been introduced to enterprises. Business processes may not only be carried out on computers (e.g., personal computers), but may also be carried out on various mobile devices. This can bring great flexibility to businesses. However, the interaction with mobile devices is different from PCs (e.g., touch screen versus keyboard or mouse). It may not be as simple to use PC design elements for mobile devices. The described technologies allow for optimization of design elements to be extended to different devices.

Implementing the described technologies may further provide relatively easier integration with a user feedback system and quick reflection of user behavior, after software is delivered to the customer(s). User behaviors may be modelled through user statistics collected under real business scenarios. User statistics may include users' operation time, background running time, data transfer time, and loading time of UI for each sub-process of different business processes. Troubleshooting and pin pointing problems may be performed quicker and be indicative of potential direction of design improvement. In addition, frequently used processes may be identified. Improvements may be prioritized in next or future round of development cycle. Actual user statistics can help to model user behaviors more accurately. The evaluation of efficiency would be more accurate and reliable. When the software is deployed through cloud service, user statistics could be collected in real-time. The changes in user behavior could be reflected in hours, instead of months. And the evolution of software could be guided in user-centered manner instead of through a bunch of bug fixes.

Figure 7:
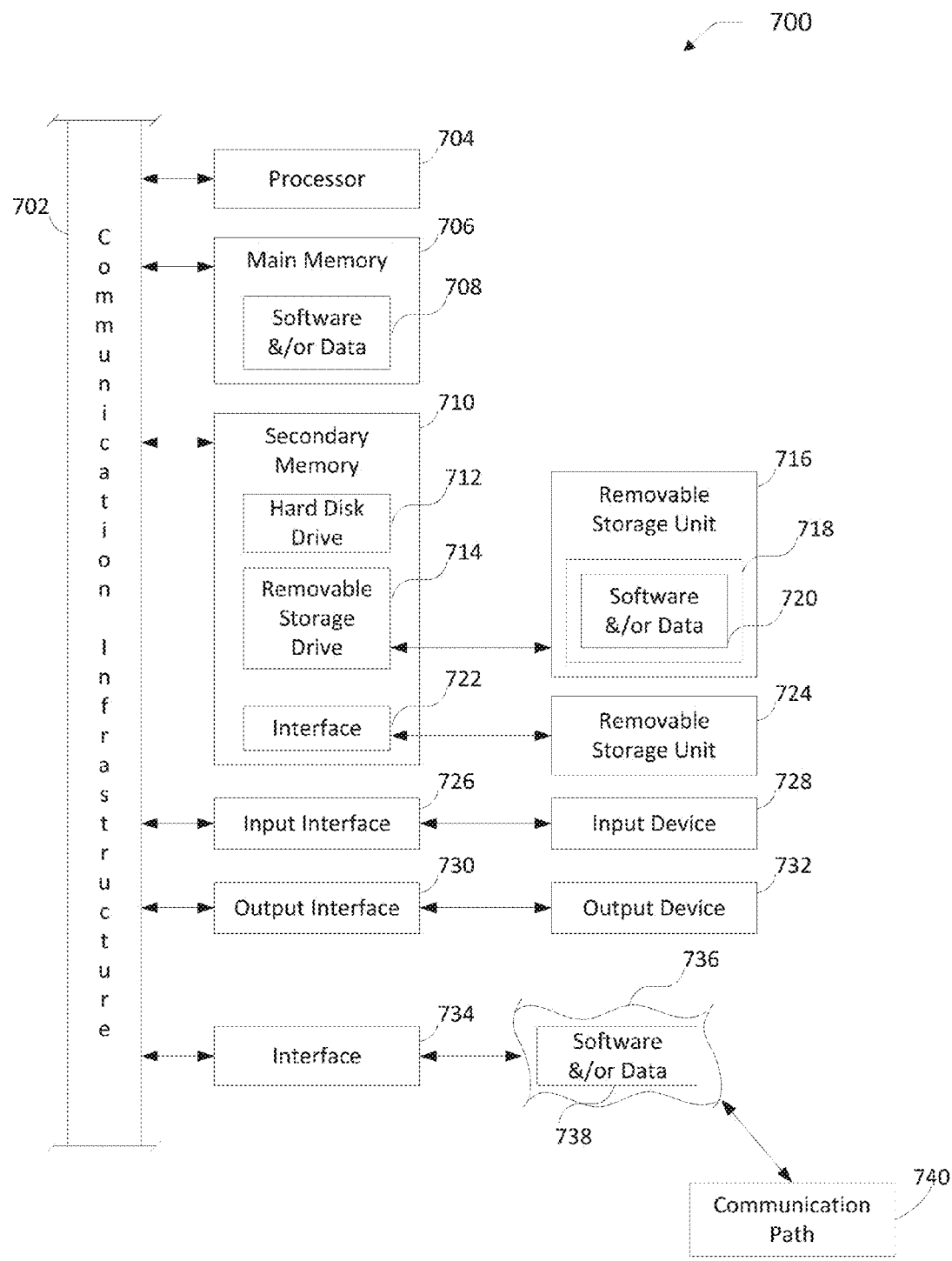
FIG. 7 illustrates an exemplary computing system to implement in accordance with the technologies described herein.

FIG. 7 illustrates an exemplary system 700 that may implement, at least in part, the technologies described herein. The computer system 700 includes one or more processors, such as processor 704. Processor 704 can be a special-purpose processor or a general-purpose processor. Processor 704 is connected to a communication infrastructure 702 (for example, a bus or a network). Depending upon the context, the computer system 700 may also be called a client device.

Computer system 700 also includes a main memory 706, preferably Random Access Memory (RAM), containing possibly inter alia computer software and/or data 708.

Computer system 700 may also include a secondary memory 710. Secondary memory 710 may include, for example, a hard disk drive 712, a removable storage drive 714, a memory stick, etc. A removable storage drive 714 may comprise a floppy disk drive, a magnetic tape drive, an optical disk drive, a flash memory, or the like. A removable storage drive 714 reads from and/or writes to a removable storage unit 716 in a well-known manner. A removable storage unit 716 may comprise a floppy disk, a magnetic tape, an optical disk, etc. which is read by and written to by removable storage drive 714. As will be appreciated by persons skilled in the relevant art(s) removable storage unit 716 includes a computer usable storage medium 718 having stored therein possibly inter alia computer software and/or data 720.

In alternative implementations, secondary memory 710 may include other similar means for allowing computer programs or other instructions to be loaded into computer system 700. Such means may include, for example, a removable storage unit 724 and an interface 722. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 724 and interfaces 722 which allow software and data to be transferred from the removable storage unit 724 to computer system 700.

Computer system 700 may also include an input interface 726 and a range of input devices 728 such as, possibly inter alia, a keyboard, a mouse, etc.

Computer system 700 may also include an output interface 730 and a range of output devices 732 such as, possibly inter alia, a display, one or more speakers, etc.

Computer system 700 may also include a communications interface 734. Communications interface 734 allows software and/or data 738 to be transferred between computer system 700 and external devices. Communications interface 734 may include a modem, a network interface (such as an Ethernet card), a communications port, a Personal Computer Memory Card International Association (PCMCIA) slot and card, or the like. Software and/or data 738 transferred via communications interface 734 are in the form of signals 736 which may be electronic, electromagnetic, optical, or other signals capable of being received by communications interface 734. These signals 736 are provided to communications interface 734 via a communications path 740. Communications path 740 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 716, removable storage unit 724, and a hard disk installed in hard disk drive 712. Computer program medium and computer usable medium can also refer to memories, such as main memory 706 and secondary memory 710, which can be memory semiconductors (e.g. Dynamic Random Access Memory (DRAM) elements, etc.). These computer program products are means for providing software to computer system 700.

Computer programs (also called computer control logic) are stored in main memory 706 and/or secondary memory 710. Such computer programs, when executed, enable computer system 700 to implement the present technology described herein. In particular, the computer programs, when executed, enable processor 704 to implement the processes of aspects of the above. Accordingly, such computer programs represent controllers of the computer system 700. Where the technology described herein is implemented, at least in part, using software, the software may be stored in a computer program product and loaded into computer system 700 using removable storage drive 714, interface 722, hard disk drive 712 or communications interface 734.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method for optimizing software design performed by one or more computing devices, comprising:
    choosing a design step in a software process;
    evaluating the software process with different design elements by repeatedly determining a sum of times used for an interaction step and a computation step of the software process to determine at least one time distribution of a user to finish the software process, wherein the time used for the interaction step is sampled from a time distribution for a user of a particular role and experience level to finish the interaction step, and the time used for the computation step is determined based on size of related data and configuration of hardware used to perform the computation step;
    determining time penalties for the different design elements during the evaluation; and
    changing a design element of the design step to one of the different design elements with the lowest time penalty.

2. The method of claim 1, wherein the software process is a sub-process, and the design elements are one or more of user actions and/or system actions.

3. The method of claim 1, wherein the evaluating comprises using user actions.

4. The method of claim 1, further comprises generating artificial agents to simulate user behavior and evaluating the software process based on the simulated user behavior.

5. The method of claim 1, wherein the evaluating comprises accounting for organization type and sub-processes in an organization using the software process.

6. The method of claim 5, wherein the organization comprises users and an information technology system.

7. The method of claim 1, wherein the evaluating determines efficiencies of different organizations and users.

8. The method of claim 1, wherein determining the time penalties is based on a set threshold time value.

9. The method of claim 1, wherein the software process is applied to more than one computing device type.

10. A device comprising:
    one or more processors;
    a process module configured to the one or more processors that receives structures of a software process;

a customer module configured to the one or more processors that models behavior of users that use the software process; and a simulation and evaluation module configured to the one or more processors that receives data from the process module and the customer module, wherein the simulation and evaluation module evaluates the software process with different design elements by repeatedly determining a sum of times used for an interaction step and a computation step of the software process to determine at least one time distribution of a user to finish the software process, wherein the time used for the interaction step is sampled from a time distribution for a user of a particular role and experience level to finish the interaction step, and the time used for the computation step is determined based on size of related data and configuration of hardware used to perform the computation step, and determining efficiencies for different design elements of the software process based on the data from the process module and the customer module.

11. The device of claim 10, wherein the process module comprises an interaction element and a computation element.

12. The device of claim 10, wherein the process module is configured to receive software process structures from a process design module.

13. The device of claim 10, wherein the customer module comprises an organization element, an information technology system element and a user element.

14. The device of claim 10, wherein the customer module is configured to receive information from a manual configuration module, a testing module, and a user feedback module.

15. The device of claim 10, wherein the customer module sends to the process module one or more of the following information: user role, user experience level, data size, or hardware configuration.

16. The device of claim 10, wherein the customer module sends to the simulation and evaluation module one or more of the following information: percentage of execution for user role or user experience level.

17. The device of claim 10 further comprising a visualization and analysis module that receives the efficiencies from the simulation and evaluation module.

18. The device of claim 10 further comprising an optimization module configured to receive information from the process module and the customer module, and compute optimal choices for the design elements.

19. One or more computer-readable media storing processor-executable instructions that when executed cause one or more processors to perform operations that provide for optimization of software process comprising:

choosing a design step in a sub-process of the software process;

evaluating the sub-process with different design elements for the chosen design step by repeatedly determining a sum of times used for an interaction step and a computation step of the sub-process to determine at least one time distribution of a user to finish the sub-process, wherein the time used for the interaction step is sampled from a time distribution for a user of a particular role and experience level to finish the interaction step, and the time used for the computation step is determined based on size of related data and configuration of hardware used to perform the computation step; and changing a design element of the design step to one of the different design elements with a lowest time penalty.

20. The one or more computer-readable media of claim 19 further comprising determining if other design steps are to be improved.

* * * * *